(12) United States Patent
Kama (10) Patent No.: US 9,135,587 B2
(45) Date of Patent: Sep. 15, 2015

(54) METHODS AND SYSTEMS FOR CREATING BUSINESS-ORIENTED REPORT ENTITIES (75) Inventor: Alon Kama, Sunnyvale, CA (US)

(73) Assignee: EMC CORPORATION, Hopkinton, MA (US)

( * ) Notice: Subject to any disclaimer, the term of this patent is extended or adjusted under 35 U.S.C. 154(b) by 296 days.

(21) Appl. No.: 13/071,266

(22) Filed: Mar. 24, 2011

(65) Prior Publication Data

US 2012/0246260 A1    Sep. 27, 2012

(51) Int. Cl.
*G06F 15/16* (2006.01)
*G06Q 10/06* (2012.01)
*G06Q 10/10* (2012.01)

(52) U.S. Cl.
CPC .............. *G06Q 10/06* (2013.01); *G06Q 10/10* (2013.01)

(58) Field of Classification Search
USPC .................................................. 709/217–223
See application file for complete search history.

(56) References Cited

U.S. PATENT DOCUMENTS

| | | | |
|---|---|---|---|
| 7,593,904 B1* | 9/2009 | Kirshenbaum et al. | 706/12 |
| 8,055,548 B2* | 11/2011 | Staib et al. | 705/26.1 |
| 8,078,571 B2* | 12/2011 | Eagan et al. | 707/603 |
| 2004/0123246 A1* | 6/2004 | Wu | 715/530 |
| 2009/0307257 A1* | 12/2009 | Menon et al. | 707/102 |
| 2009/0323910 A1* | 12/2009 | Sharma | 379/88.18 |
| 2010/0293507 A1* | 11/2010 | Song et al. | 715/810 |
| 2011/0035744 A1* | 2/2011 | Bhatia | 717/174 |

OTHER PUBLICATIONS

COGNOS 8 Business Intelligence, Report Studio, User Guide, pp. 1-458.
IBM Software Group, White Paper, Business Analytics, 2010, pp. 1-9.

* cited by examiner

*Primary Examiner* — Hua Fan
(74) *Attorney, Agent, or Firm* — Dergosits & Noah LLP; Todd A. Noah (57) ABSTRACT

In an implementation, when creating a report, a user is provided with one or more suggestions for the report, such as a suggested grouping category, based on what has been done in one or more previous reports.

18 Claims, 8 Drawing Sheets

Figure 13 ic systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

METHODS AND SYSTEMS FOR CREATING BUSINESS-ORIENTED REPORT ENTITIES

BACKGROUND

Advances in technology have allowed many business processes to become automated. Such processes may be connected to activities such as operations, sales, marketing, governance, product development, and so forth. Some specific examples of processes include underwriting, loan origination, benefits administration, customer service, product change requests, complaint management, quality management, and many others.

These processes generate an enormous amount of data. In order to understand the data, reports which summarize, aggregate, and analyze the data are needed. A proper report can inform managers what products customers are buying, how long it takes to resolve issues, and forecast sales trends—just to name a few examples. However, creating a report is often a complex task.

For example, a user may create a data set for a report by issuing a direct query against the database where this data is stored. However, this technique generally requires that the user be very familiar with query language (e.g., SQL, DQL, XQuery, and the like) and also the underlying schema of the data. Further, when creating a report, the user generally starts from scratch and may not have any knowledge about what has been done previously. This can be very overwhelming, especially when the user is non-technical, is new, and must select data from a very large and complicated schema in order to create a report.

Therefore, there is a need to provide improved report creation techniques that allow non-technical users to easily create meaningful and useful reports.

DETAILED DESCRIPTION

Figure 1:
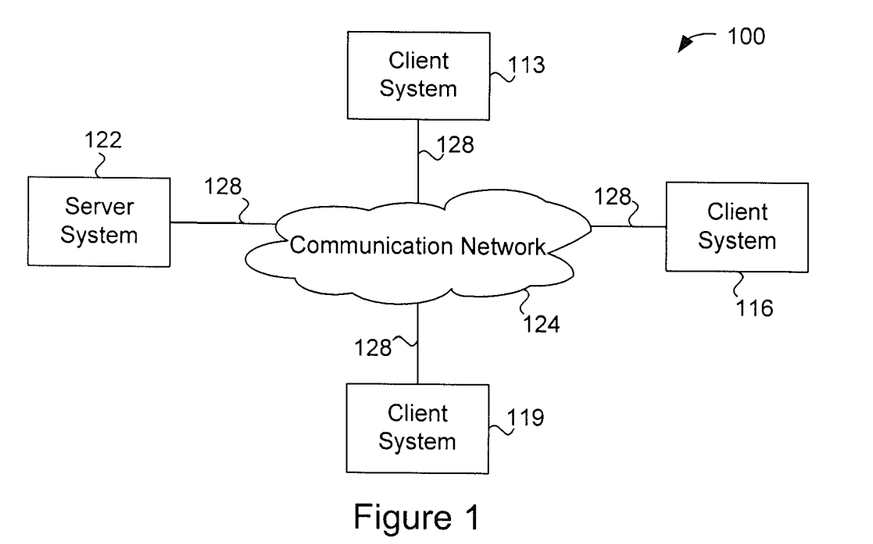
FIG. 1 shows a block diagram of a client-server system and network in which an embodiment of the invention may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, and the Firefox browser provided by Mozilla Foundation, and others.

Figure 2:
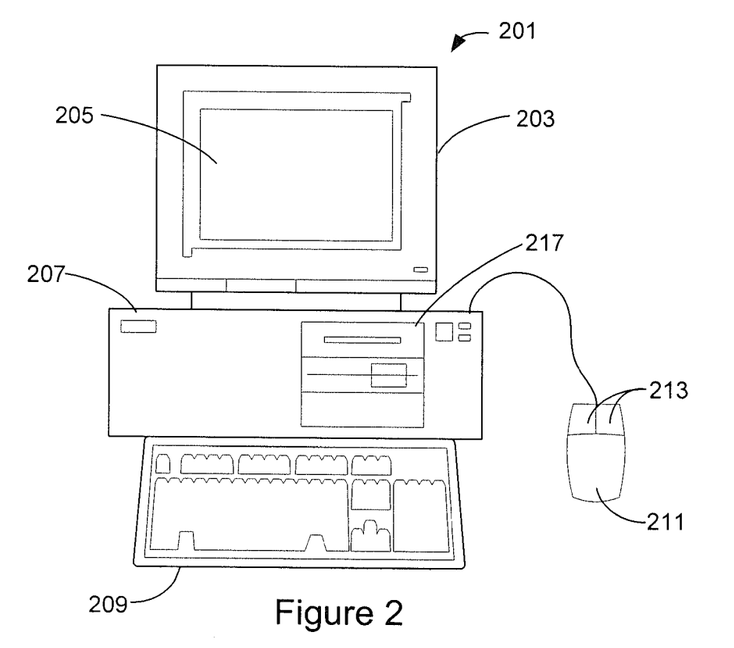
FIG. 2 shows a more detailed diagram of an exemplary client or computer which may be used in an implementation of the invention.

FIG. 2 shows an exemplary client or server system. In an embodiment, a user interfaces with the system through a computer workstation system, such as shown in FIG. 2. FIG.

2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other non-volatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
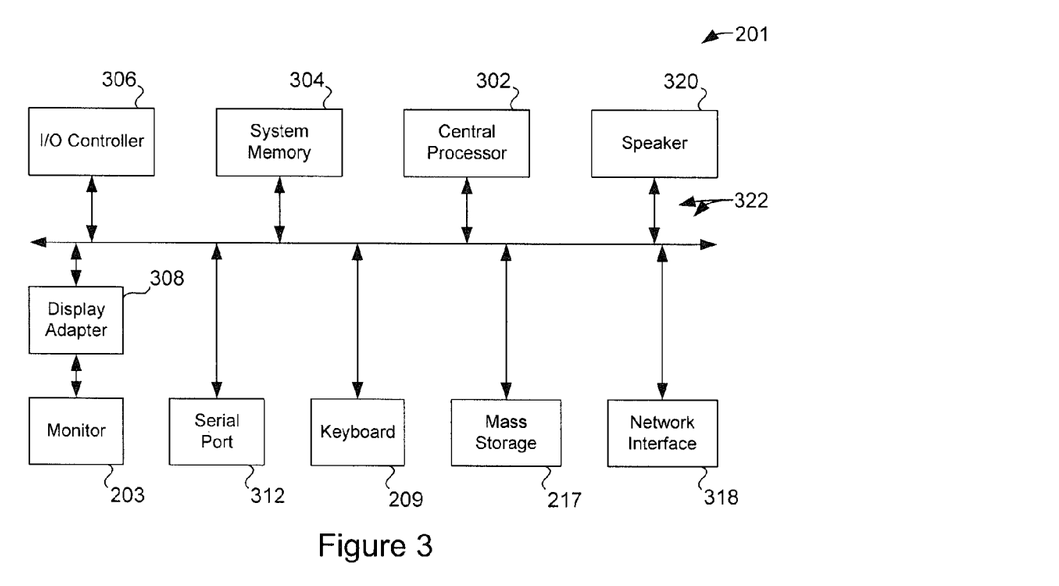
FIG. 3 shows a system block diagram of a client computer system used to provide a user interface according to an embodiment.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, interne, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
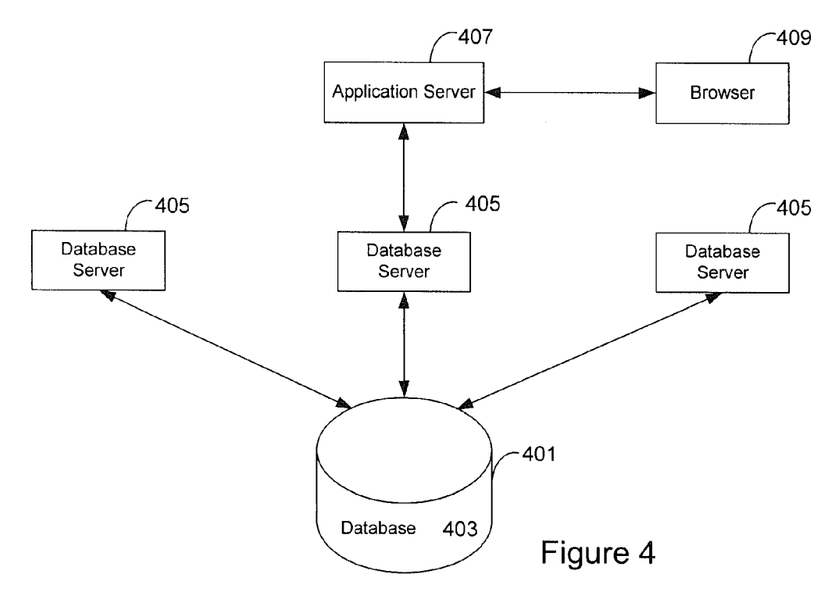
FIG. 4 shows a data source or data service in the form of a database system.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

Figure 5:
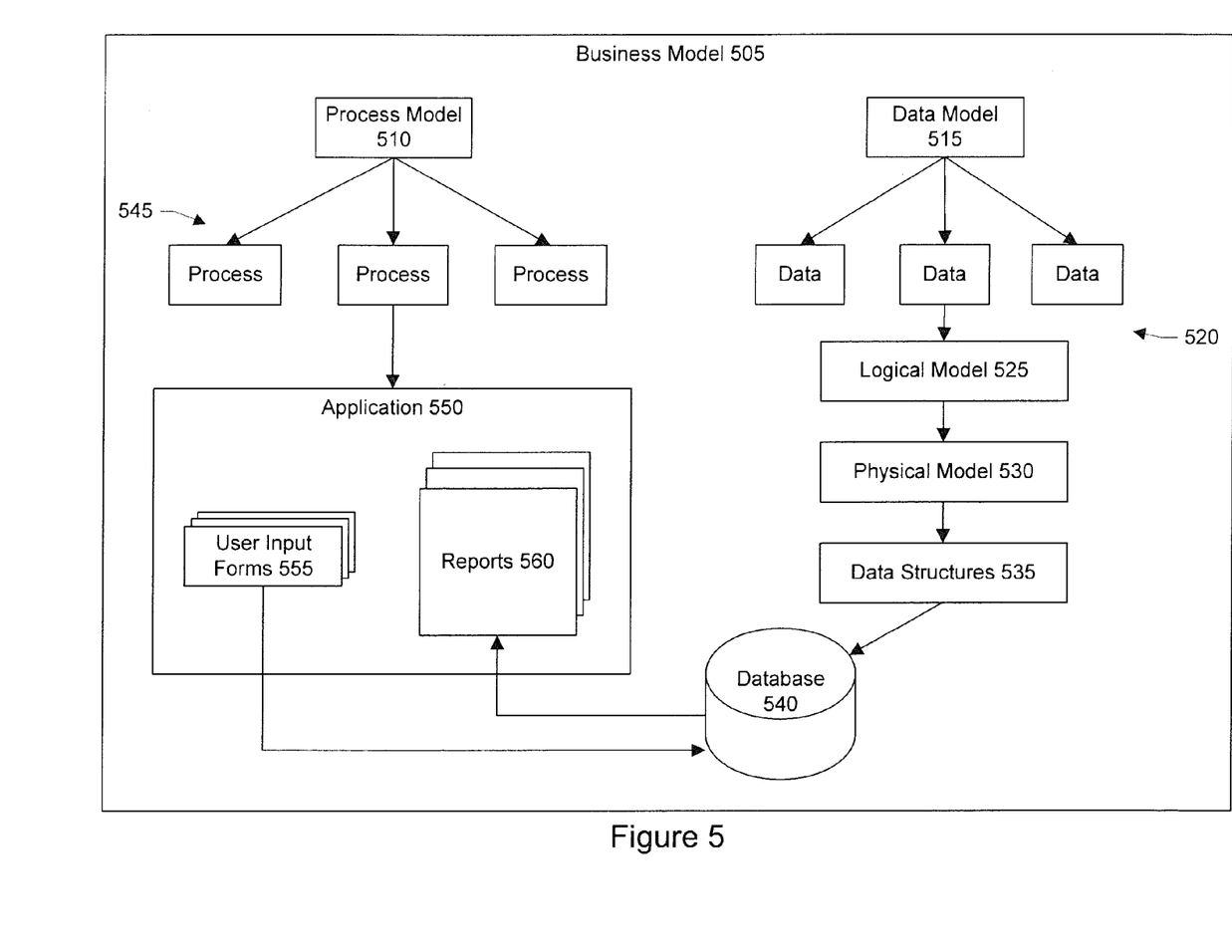
FIG. 5 shows a block diagram of a business model.

FIG. 5 shows an overview of a general business model 505. This business model includes a process and data model 510 and 515, respectively. The data model includes data 520 which can be represented through logical and physical models 525 and 530, respectively. Data structures 535 organize the data for storage in a database 540. The process model is a model of one or more business processes and defines the ways in which operations are carried out to accomplish the intended objectives of an organization. A process model can include one or more processes 545 which are modeled by an application 550. The application can include user input forms 555 so that data can be inputted and stored in the database.

The application further includes reports 560 that may be provided through a reporting tool or module so that data from the database can be retrieved through queries, filtered, aggregated, and formatted into meaningful charts and summaries. The reports can be displayed on an electronic screen of a computer, printed out on paper, or both. In a specific implementation, a displayed report is an interactive report. That is, the user can interact with the report such as by using an input device (e.g., mouse or keyboard) to adjust the time period over which the data in the report is aggregated in order to see aggregations for different time periods. Such reports enable users to monitor and improve the process, make decisions, and address potential problems.

Figure 6:
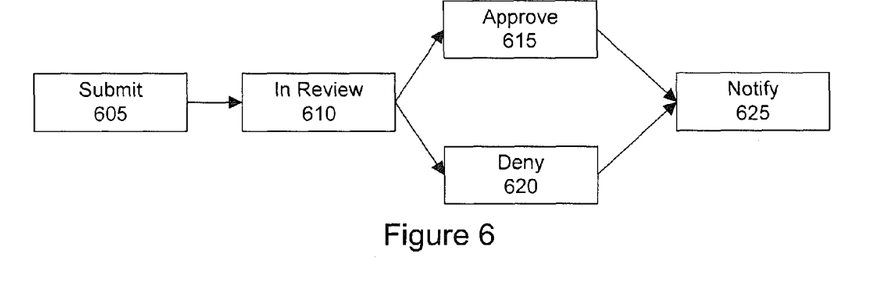
FIG. 6 shows a block diagram of an example of a business process.

FIG. 6 shows an overview of an example of a business process. Business processes occur in many contexts such as commercial, government, law, health-care, insurance, retail, telecommunications, and other domains. A business process may be connected to operations such as purchasing, manufacturing, marketing, and sales. A process, such as that shown in FIG. 6, orchestrates a combination of human and automated activities that produce and deliver information. During the course of the process, users may add documents and enter business data. The process uses this information to route tasks, action items, files, documents, notifications, alerts, and so forth, to the appropriate people. The people working in the process use this process information to make decisions.

The business process may be modeled using an automated software tool such as that provided by the EMC® Documentum® Business Process Suite. Using an automated system can reduce the need for time-consuming and error-prone paper-based systems to compile and manage process data, improve processing time by eliminating the need to locate and physically transport information stored in file cabinets, enable ongoing monitoring and control of the process through reports and real-time dashboards, allow process participants to interact by giving their inputs and participating in discussion threads, provide security and information rights management to keep personal information secure, and can help provide a secure repository to meet government requirements for secure records management.

The business process shown in the example of FIG. 6 includes steps 605 (Submit), 610 (Review), 615 (Approve), 620 (Deny), and 625 (Notify). Some specific flows are presented in this application, but it should be understood that the business process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular application or based on the data. For example, a flow may use different trigger and transition methods. Triggers may invoke activities that are not connected to a previous activity by a flow (i.e., they're waiting on external events). A transition decision may activate one or more subsequent activities, depending on transition logic.

Each of the steps shown in FIG. 6 may include one or more related subprocesses and activities. Activities can be manual or automatic. Manual activities are performed by users and can include users accessing their inbox, viewing the details of an activity, and providing input that allows the business process to continue execution. Automatic activities are performed by code or executable computer code that can include business logic to interact with the business process and the information provided by the users to complete the process. An activity may include data from outside the process, such as information retrieved from the Internet or from other external systems via a web service. Each of the steps may include various groups and roles (e.g., administrators, originators, reviewers, managers, supervisors, executives, and the like) and performers (e.g., "Jane," "Tim," "Bob," and so forth). A step in a process may include time-based information regarding receipt, creation, milestones, due dates, duration, start time, end or completion time, or combinations of these.

Figure 7:
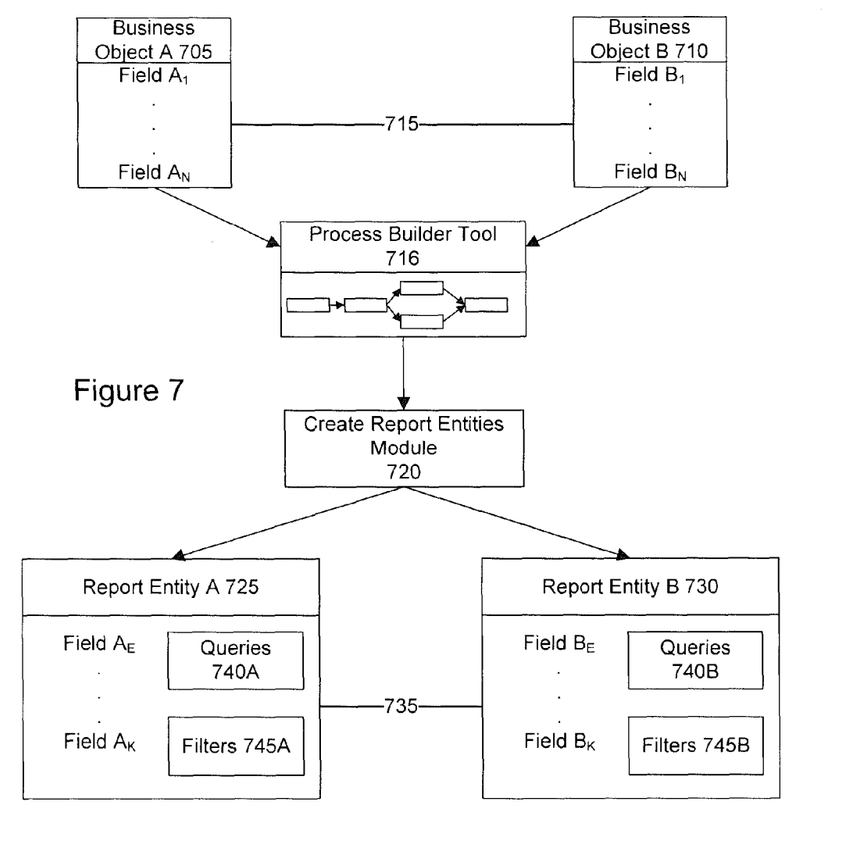
FIG. 7 shows a block diagram for automatically creating report entities based on business objects.

FIG. 7 shows a block diagram for the automatic creation of report entities for reporting on a process. As shown in the example of FIG. 7, there is a business object A 705, a business object B 710, and a business object relationship 715 between business objects A and B. The business objects are derived from process model 510 and data model 515. A process builder tool 716 is used to create various business processes based on the business objects. A create report entities module 720 creates report entities and relationships between the report entities based on the business process created by a user using the process builder tool.

Creating a business process typically begins with creating the business objects and identifying the relationships between the objects. Generally, a business object represents a thing about which data is collected. For example, there can be a customer business object representing the collection of customers of a company; an employee business object representing the collection of employees of the company; a product business object representing the collection of products of the company; an order business object representing product orders submitted by the company's customers; and so forth. A report entity may instead or additionally be derived by other aspects of the process, such as the roles of activity performers; relations between activities; triggers; timeouts and other time-based notifications; actions such as reassignments, rejections, collaboration conversations; and audit information (e.g., "who changed what and when").

A set of fields or attributes is associated with each of the business objects. In the example shown in FIG. 7, fields $A_{1-N}$ are associated with business object A and fields $B_{1-N}$ are associated with business object B. The fields characterize the object or describe the object and may be mapped to table columns in a database table which store the values for the fields. For example, a customer business object may have fields such as customer ID, company name, address, city, state, and phone number. An accounts receivable business object may have fields such as account number, credit score, balance due, due date, overdue amount, and customer ID. A business object can represent a table in a database.

The business object relationship describes or captures how two or more business objects are related to or associated with each other. Some examples of relationships include one-to-one, one-to-many, and many-to-many. In a one-to-one relationship, each item of an object can be associated with at most one item of another object. For example, the relationship between a customer business object and an account receivable business object may be one-to-one. That is, a customer (in the customer business object) can have at most one associated account receivable (in the account receivable business object). Similarly, one account receivable has only one associated customer. In a one-to-many relationship, each item of an object can be associated with many items of another object. For example, the relationship between the customer business object and a purchase order business object may be a one-to-many relationship. That is, a single customer (in the customer business object) can have many associated purchase orders (in the purchase orders business object). Conversely, each purchase order has only one associated customer. In a many-to-many relationship, any number of items in an object can be associated with any number of items in another object. For example, the relationship between the purchase order business object and a product business object may be a many-to-many relationship. That is, each purchase order (in the purchase order business object) can have many associated products (in the products business object). Conversely, each product can have many associated purchase orders.

A user uses the process builder tool and business objects to create business processes. Some specific examples of business processes include loan or mortgage processing, new account openings, inventory procurement, alternate supplier activity, customer order fulfillment processing, grant application processing, new drug approval processing, recruitment, technical support, and many others. These processes may include various activities, conditional routings, alerts, flows, triggers, tasks, notifications, business requirements and the like which involve data or fields from the business objects. For example, as part of a process there can be a requirement that marketing documents are to be reviewed and approved by the VP of marketing; a requirement that engineering documents are to be reviewed by the VP of Engineering; and so forth. A process, such as inventory procurement, may be associated with attributes such as requested date, delivery date, and so forth which are identified in the business objects.

In a specific implementation, the create report entities module automatically creates (i.e., without user or human intervention) report entities A 725 and B 730 and a report entity relationship 735 between the report entities. A report entity can include queries (e.g., 740A, 740B), filters (e.g., 745A, 745B), or both. The report entities are created automatically upon creation of the business process. The report entities are used to create reports and visual charts. The report entities provide an abstraction to database tables and the complex joins among those tables. A feature of the report entity is that the report entity can mirror the corresponding business object associated with the process. Similarly, the relationship between the report entities can mirror the relationship between the corresponding business objects. In a specific implementation, the report entities have the same name as the corresponding business object. In another specific implementation, the names are different. A report entity can include one or more fields from the corresponding business object. A report entity can include fields from a single table or a collection of tables. In a specific implementation, a report entity includes fields that are not in the business object itself, such as computed fields, timestamps, and so forth.

For example, as shown in FIG. 7, report entity A includes fields $A_{E-K}$. Fields $A_{E-K}$ may include all or a subset of the fields from business object A. Similarly, report entity B includes fields $B_{E-K}$. Fields $B_{E-K}$ may include all or a subset of the fields from business object B. The create report entity module can select significant or relevant fields from the created business process to include in the report entities. A significant field is a field that the system determines might be of interest in a report. Selection of a field to include in a report entity can include criteria such as the frequency with which the field is referenced in the business process, the type of activity associated with the field (e.g., manual activity versus automatic activity), the type of data stored in the field, whether or not the field has been pre-identified as being a reportable field such as by a template or the user identifying the field as reportable during process creation, or combinations of these.

For example, a field that is referenced many times during the process may be selected by the create report entities module because the frequency of the field appearing throughout the process may provide an indication of the importance of the field. Manual activities, i.e., those activities that involve users taking actions, will generally be of greater interest than automatic activities, i.e., those activities that are performed by a computer. So, the create report entity module may select fields associated with manual activities to be included in the report entity and exclude fields associated with automatic activities. As another example, fields that are time-based may be selected because it is generally desirable to know when something starts or ends, how long something takes, how long something is overdue by, how early something was completed, what the milestones are, or combinations of these. As another example, fields identifying certain roles (e.g., manager or director), performers, business units, departments, or combinations of these may be selected to be included in the report entity because it can be desirable to identify those persons, groups of persons, or both responsible for various aspects of the process.

In a specific implementation, a report entity includes one or more queries such as a SQL query. A query may include clauses such as SELECT, FROM, WHERE, ORDER BY, GROUP BY, or combinations of these. The SELECT clause lists the columns that are to be returned in the results. The FROM clause lists the tables or views from which data is to be selected. The WHERE clause provides conditions for the selection of rows in the results. The WHERE clause may be referred to as a filter that passes rows that meet the conditions and blocks rows that do not meet the conditions. The ORDER BY clause specifies the order in which rows are to be returned. The GROUP BY clause groups rows for various aggregate functions.

In a specific implementation, the FROM clause includes a JOIN subclause to specify rules for joining two or more tables. A JOIN is a database operation that combines data from multiple tables. Often there will be related data that is stored in different tables. A JOIN can be used to retrieve data from the two or more tables. The JOIN clause, which is typically inside the WHERE clause, specifies how the data in the two tables or more tables is related so that the query can return a correct representation of the related data. Typically, the primary key in one table and the foreign key in the other table are used to match up the rows of data in the tables.

There are two different types of joins including an inner join and an outer join. An inner join returns only rows that are matched in the tables. An outer join returns all rows from one (or both) of the tables, regardless of whether matching rows are found in the joined tables. Specifically, there are three types of outer joins that can be used: a left outer join, a right outer join, and a full outer join. A left outer join returns all rows from the first (or left-hand) table in the join, and data from any matching rows found in the second (or right-hand) table. A right outer join returns all rows from the right-hand table in the join, and data from any matching rows found in the left-hand table. A full outer join returns all rows from both tables, regardless of whether matching data is found between them.

In this specific implementation, the system automatically creates a query fragment, including the specific type of join, to be included with a report entity. The fields for the specific query clauses are based on the process created by the process builder tool, the field data types, or both. Some examples of data types include strings, integers, date and time, and so forth. Because strings are typically used in GROUP BY operations, in a specific implementation, the system automatically creates a query fragment having a GROUP BY operation, where a parameter of the GROUP BY operation is a string field that was specified in the process. A report entity may include report metrics, methods, operations, or functions such as a COUNT, MIN, MAX, AVERAGE, or MEDIAN.

In a specific implementation, a full-fledged or complete query is composed out of the query fragments, after the report is fully specified. For example, the GROUP BY is a fragment and is composed into a full query when the report builder decides the dimension, but not at the time that the report entity is generated. As a further example, if a field from a second entity is designated as a dimension, then the query will be a right-outer join. If two fields (one from each entity) are selected as dimensions, then the query will be an inner join. Also, if a particular field is chosen to be a filter, it influences or helps to determine the join decision in the same way. In a specific implementation, a runtime filter is specified during report creation. This allows a report designer to identify which fields should be included for the report. This designation can also help determine the value for the "GROUP BY" for the aggregation.

As shown in FIG. 7, report entity A is related to report entity B as shown by report entity relationship 735. Report entity A includes a query that specifies how report entities A and B are joined. As discussed above, in this specific implementation, the queries or query fragments are automatically created upon creation of the business process. These queries or query fragments may be referred to as pre-built queries or fragments because they are built or created by the system before the business process is placed into operation, i.e., before users begin entering input information related to the process to be stored in the database.

Figure 8:
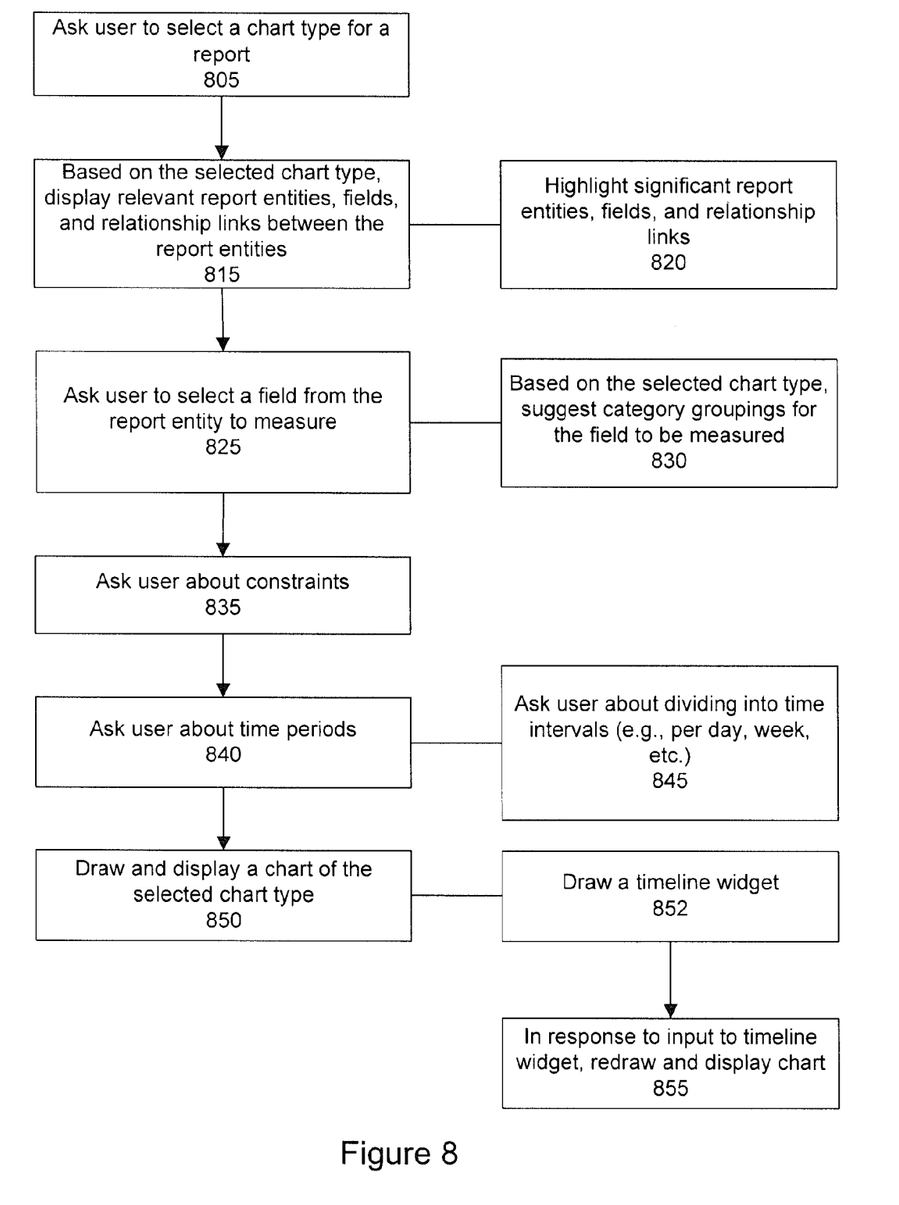
FIG. 8 shows a flow for a question-directed report creation process.

FIG. 8 shows a flow for creating a report with the pre-built report entities. In a specific implementation, the system prompts the user through the report creation process by using a series of directed questions. The set of directed questions may be referred to as a report creation wizard. That is, report creation is done by asking a user questions about what the report should contain, rather than requiring the user to use technical constructs and query language (e.g., SQL, DQL, XQuery, and the like). This can help to put the focus on the visual and analytical aspects of the report, rather than the underlying query, and allows non-technical users, such as a business analyst to create reports. A user's response to a question can determine what a subsequent question will be so that the user will be guided by the system through the report creation.

In brief, a flow for creating reports using a question-directed technique includes asking a user to select a chart type for a report and receiving the selected chart type (step 805); based on the selected chart type, displaying relevant report entities, fields, and relationship links between the report entities (step 815); highlighting significant report entities, fields, and relationship links (step 820); upon receiving a selected report entity, asking the user to select a field to be measured (step 825) and, based on the selected chart type, making category grouping suggestions for the field to be measured (step 830); asking the user about constraints (step 835); asking the user about time periods (steps 840 and 845); drawing or generating a chart of the selected chart type and a timeline widget (steps 850 and 852); and, in response to user input to the timeline widget, redrawing or regenerating the chart (step 855).

More specifically, in a step 805, the system asks the user to select a chart type for a report. In a specific implementation, subsequent questions presented to the user are based on the selected chart type. In this specific implementation, if a report entity, a field of a report entity, or data source is not relevant to the selected chart type, the system does not display the report entity, field, or data source. Some examples of chart types include a gauge, pie, or bar chart. A gauge chart shows a single numerical result that is mapped onto a visual graph that displays a minimum, maximum, and result relative to the minimum and maximum and to a reference value, such as a Service Level Agreement metric. Since a gauge chart generally measures a single field, the system can prevent the user from selecting a second field after the single field has been selected. As another example, a gauge chart typically reports a number, so the system can prevent date fields, string fields, or both from being shown so as to not confuse the user. A gauge chart may be referred to as a meter chart. Pie and bar charts are generally characterized by having two dimensions: the dimension (e.g., grouping or context) and the fact (e.g., numeric data). A pie chart is a circular chart divided into sectors or slices, illustrating proportion. In a pie chart, the arc length of each sector (and consequently its central angle and area), is proportional to the quantity it represents. A pie chart may be referred to as a circle graph. A bar chart is a graph having parallel bars or rectangles with lengths proportional to the frequency with which specified quantities occur in a set of data. The bars are typically oriented vertically, but may instead be oriented horizontally. A bar chart may be referred to as a bar graph.

Asking for the chart type in advance can help guide the user or direct the aspects to the proper place. For example, when choosing a gauge chart, the system can direct the user to which aspect should be used for the gauge needle and which aspect for the Service Level Agreement ("SLA").

Figure 9:
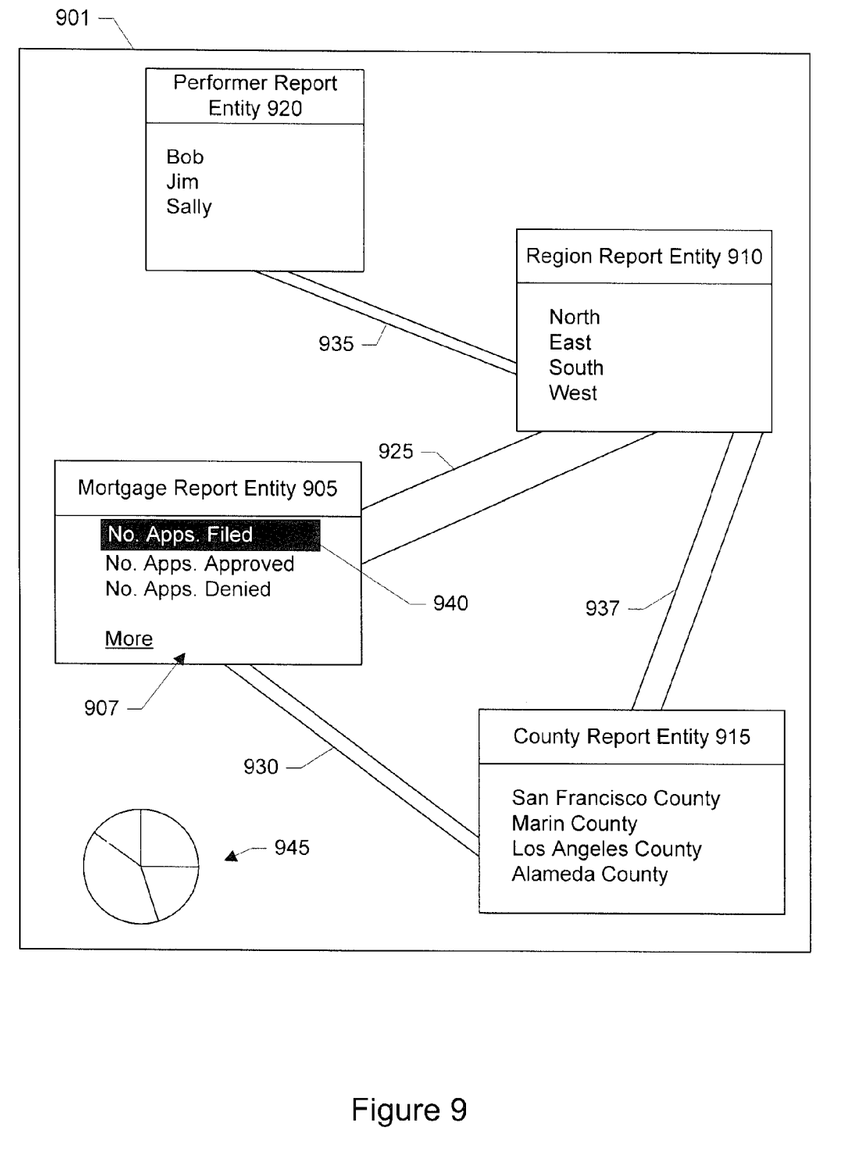
FIG. 9 shows a user interface displaying report entities and relationships between the report entities.

In a step 815, based on the selected chart type, the system displays relevant report entities, their fields, and the relationship links between the report entities for the user to make a selection of what to report on and what to measure. For example, FIG. 9 is an example of a graphical user interface 901 which shows some report entities, their fields, and the relationship links between the report entities. The interface may be displayed on an electronic screen such as within the window of the reporting tool application or within a browser window. In a specific implementation, the interface is a three-dimensional (3-D) representation of the report entities where users receive the impression of exploring a vast virtual landscape of report entities and the relationships between the report entities. In another specific implementation, the interface is a two-dimensional (2-D) representation.

More particularly, as shown in FIG. 9, there is a graphical representation of report entities 905, 910, 915, and 920; and relationship links 925, 930, 935, and 937. Relationship link 925 extends between report entities 905 and 910. Relationship link 930 extends between report entities 905 and 915. Relationship link 935 extends between report entity 910 and 920. Relationship link 937 extends between report entity 915 and 910. The relationship link represents the relationship between the entities. Some examples of relationships, as discussed above, include one-to-one, one-to-many, and manyto-many. A specific example of a relationship between two report entities is provided below.

As an example, report entity 905 can represent a mortgage report entity and includes fields 907 related to the mortgage process such as number of mortgage applications filed or completed, number of applications approved, number of applications denied, and the like. There can be a "more" link or other control (e.g., up/down arrow) that permits the user to scroll through and see additional fields of the entity. Report entity 920 represents performers such as those persons responsible for reviewing and approving or denying mortgage applications. Report entity 910 represents the geographical regions where the mortgage applications originated. Report entity 915 represents the counties where the mortgage applications originated.

This application describes some specific business processes (e.g., mortgage processing) for illustration purposes. It should be appreciated, however, that these specific business processes are merely examples and principles and techniques of the invention that can be applied to many different business processes.

In this specific implementation, a user creating a report can select and drag the report entities across the screen in order to bring various report entities into focus. The interface encourages exploration because the relationships are present and the user is free to roam the space and visit the entities. In a specific implementation, a portion 945 of the interface includes the selected chart type which is dynamically updated based on what report entity and fields the user selects.

In a specific implementation, the system highlights significant entities, fields, and links (step 820, FIG. 8). Significance may be determined by the frequency with which the entity, for example, had been selected for use or included in previous reports. That is, significance may be based on the number of times the entity has been selected for use in previous or past reports, i.e., reports that have already been created. In this specific implementation, entities, fields, links, or combinations of these that have been frequently used are highlighted so that they will appear more prominent than entities, fields, and links that have been less frequently used. The highlighting can help an analyst, such as a new analyst, create meaningful reports because the new analyst, through the highlighting, receives an indication of what is typically reported. For example, as shown in FIG. 9, the field "No. Apps. Filed" is highlighted 940 to indicate that this field (Number of Mortgage Applications Filed) is a field that is often included in other reports. The field is highlighted by the system before the user selects the field.

Any highlighting technique or style that visually distinguishes one entity, field, or relationship from another entity, field, or relationship may be used. Some examples of highlighting styles include the use of different font sizes, different colors (e.g., yellow, blue, red, green, or purple), different font colors, different background colors, different line weights, bolding, different patterns, different formatting (e.g., italics, underlining, broken lines), and the like. For example, relationship link 925 has been more frequently used in previous reports than relationship link 935. So, the system displays relationship link 925 using a heavier line weight or a thicker line than link 935. In other words, the system calculates which are the significant links based on whether other reports are using this relationship. Significant links are marked more boldly in order to ease the analyst's exploration of the application data model and zero in on the relationships that matter for this particular report. Frequency of use in previous reports is merely one criteria or factor in determining significance and other criteria may instead or additionally be used. For example, a field may have been marked as significant for reporting in the data model. Another example includes a predefined prominence of fields, such as performer roles and timestamps, which are generally considered significant. For a report that is created after a significant amount of data has already been collected in the database, a business object with little or no data can lower the respective report entity's significance.

In a specific implementation, the system permits the user to select at most a single report entity to report on, but allows the user to select other fields in other report entities that are related to the single report entity, i.e., report entities that are children of the single report entity, in order to provide some guidance to the user. For example, when two or more entities are needed for a report, one of the entities may be the dominate entity, i.e., the parent. Upon selecting the parent, the user can choose the fields or aspects of any entities that are children of the parent.

In a specific implementation, the report entities are implemented as a node that includes information. The report entity is tied to data and to the desired chart type. An interface, such as the interface shown in FIG. 9, can reveal the entire network of links, unlike a palette, and can provide an easier conceptual understanding of the relationships and the parent-child relations. This interface can encourage play and discovery, provides users with a place to start, and detaches data source building from a rigid step-by-step. Through the interface, a user may also link a parent to a child in order to form a composed complex entity.

Referring now to FIG. 8, in a step 825, upon receiving a selection of a report entity to report on, the system asks the user to select a field of the report entity to measure, i.e., a field to be graphed. As discussed above, fields that are frequently used in previous reports may be highlighted in order to visually distinguish the field from fields that are less frequently used. The fields may instead or additionally be ranked, sorted, or ordered so that more frequently used fields are displayed above less frequently used fields. In other words, in a specific implementation, when a report entity is selected, the statistically most-used fields are highlighted first, with the accompanying data. Other fields can be selected and their values shown. Users can scroll through to see more data rows.

Figure 10:
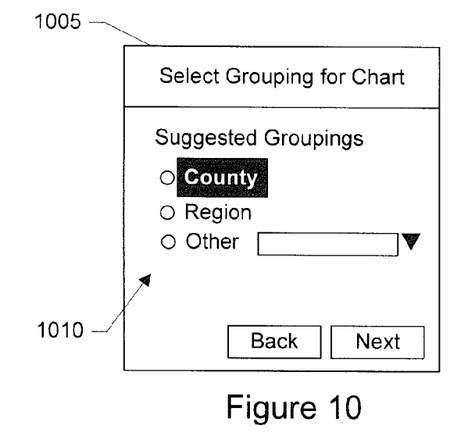
FIG. 10 shows a dialog box of suggested groupings for a report.

In a specific implementation, in a step 830, based on the selected chart type, the system offers grouping or category suggestions. For example, chart types such as pie and bar charts, group the data into various categories. Thus, for a pie chart, one slice of the pie represents one grouping or category and another slice of the pie represents another grouping or category. Similarly, for a bar chart, one bar of the chart represents one grouping and another bar of the chart represents another grouping. FIG. 10 shows an example of a suggested groupings dialog box 1005 from the report wizard. The suggested groupings dialog box includes a suggested groupings list 1010. The groupings list can include any number suggestions for grouping the information for the selected chart type.

Specifically, in this example, the user has selected from the mortgage report entity, the field "No. apps. filed" to measure the number of mortgage applications filed or completed (steps 815 and 825). Thus, as shown in FIG. 10, the user can select to group the number of filed applications by county (e.g., San Francisco County, Marin County, or Los Angeles County), by region (e.g., North, East, South, or West), and so forth. Alternatively, the user can select another grouping, such as by performer (e.g., Bob, Jim, or Sally), from the dropdown list in the dialog box. For example, if the user chooses to group by county, the system generates a chart, such as a pie chart, where each of the pie slices or wedges represents a particular county and the size of the pie slice is proportional to the number of mortgage applications filed in that particular county.

In a specific implementation, as in the highlighting of report entities discussed above, the system can highlight groupings that have frequently been used or included in previous reports so that the analyst receives an indication of what some typical groupings are. For example, as shown in FIG. 10, the grouping category "County" has been highlighted thereby indicating that the grouping has often been used in previous reports. The list of suggested groupings may be ranked or ordered based on the number of times the grouping has been used in previous reports. Groupings that are more frequently used can be displayed above groupings that are less frequently used.

Referring now to FIG. 8, in a step 835, the system asks the user whether he wants to include a constraint. In a step 840, the system asks the user whether he wants to specify a time period. And, if a time period is specified, whether the time period should be divided according to some time interval (e.g., per day or per week). For example, a bar chart report that shows a quarter-by-quarter count of mortgage applications from Marin County could highlight a trend, such as an increased number of filings in July. Asking time-related questions, i.e., asking on a historical aspect, allows the user to indicate how far back he wants to go. Knowing this information can be desirable because it allows for purging and discouraging database bloat. For example, if a report only looks at the past 30 days, the system can start purging from day 31. Specifically, in some implementations, the database data is cloned to serve a specific report. This can improve the report query performance, and can allow for archiving the raw data. Such a clone may be purged of data that is outside of the 30-day window (or other specified rolling time period).

In a step 850, the system draws and displays a chart of the selected chart type and a timeline widget. The user can select the timeline widget to see the chart data aggregated over a different time period (step 855). It should be appreciated that some steps in the flow are optional. For example, a user does not necessarily have to specify a constraint (step 835).

Figure 11:
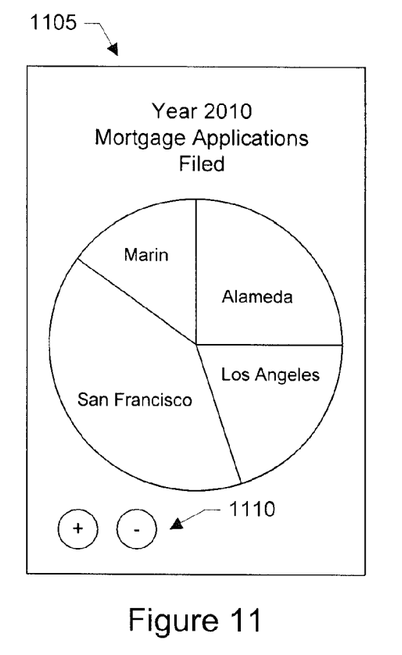
FIG. 11 shows an example of a report having a pie chart that aggregates data over a first time period.
Figure 12:
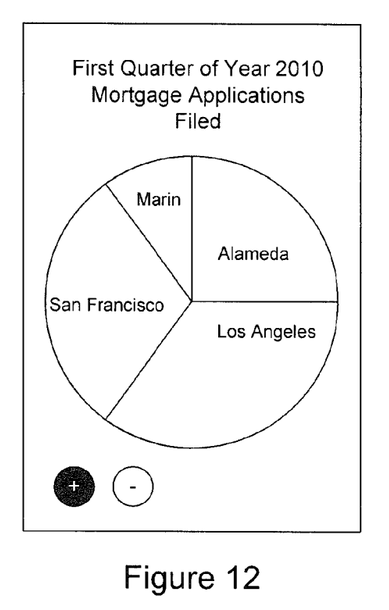
FIG. 12 shows an example of a report having a pie chart that aggregates data over a second time period.

FIG. 11 shows an example of a displayed chart 1105 and a timeline widget 1110. In this example, the displayed chart is a pie chart showing the number of filed mortgage applications grouped by county. The size of the pie chart wedges represents an aggregation of the filed mortgage applications in that county. This specific implementation of the timeline widget includes a "plus" (+) and "minus" (−) control so that the user can "drill-down" and "drill-up" in order to analyze different time granularities. In this example, a yearly summary is shown. That is, the aggregation is over a first time period of 1 year. However, a user can click the "plus" control to drill into the year to see an aggregation over a second time period, different from the first time period. In other words, to see the breakdown by quarters, months, and so forth, i.e., a second time period. The second time period may be of different duration than the first time period. For example, the first time period may be one year and the second time period may be one quarter. Alternatively, the first and second time period may be of the same duration, but of a different period. For example, the first time period may be "Year 1" and the second time period may be "Year 2."

Thus, in a specific implementation, a report includes a fluid historical drilldown. In this specific implementation, for reports that are time-based, the system automatically creates a "drill-down" and "drill-up" aggregation of the data so that the report consumer can analyze trends using different time granularities. For example, a report may give a yearly summary of information, but allows the user to drill into a particular year to see the breakdowns by quarters, then by months, and so forth.

It should be appreciated that FIG. 11 shows merely one specific example of a timeline widget. A timeline widget may instead or additionally include an indicator which can be dragged to change the time period over which the data is aggregated, a scroll bar, timeline buttons, and the like.

As another example, a user may instead select a gauge chart to show the number of completed mortgage applications, based on the bank branch and time period. In brief, a flow for this example is:

1) System asks what to report on.
2) User finds the mortgage report entity.
3) System asks what to measure.
4) User chooses the field identified as "No. Completed."
5) System asks whether to put constraints.
6) User indicates "yes" and adds a relation to a Performer of the process, and then chooses the field identified as "Branch" (i.e., the branch at which that performer works). User further indicates that the particular branch is chosen during report runtime. That is, the branch is not hard-coded.
7) System asks whether the aggregation is historical, i.e., whether to add an additional runtime filter on time period.

Figure 13:
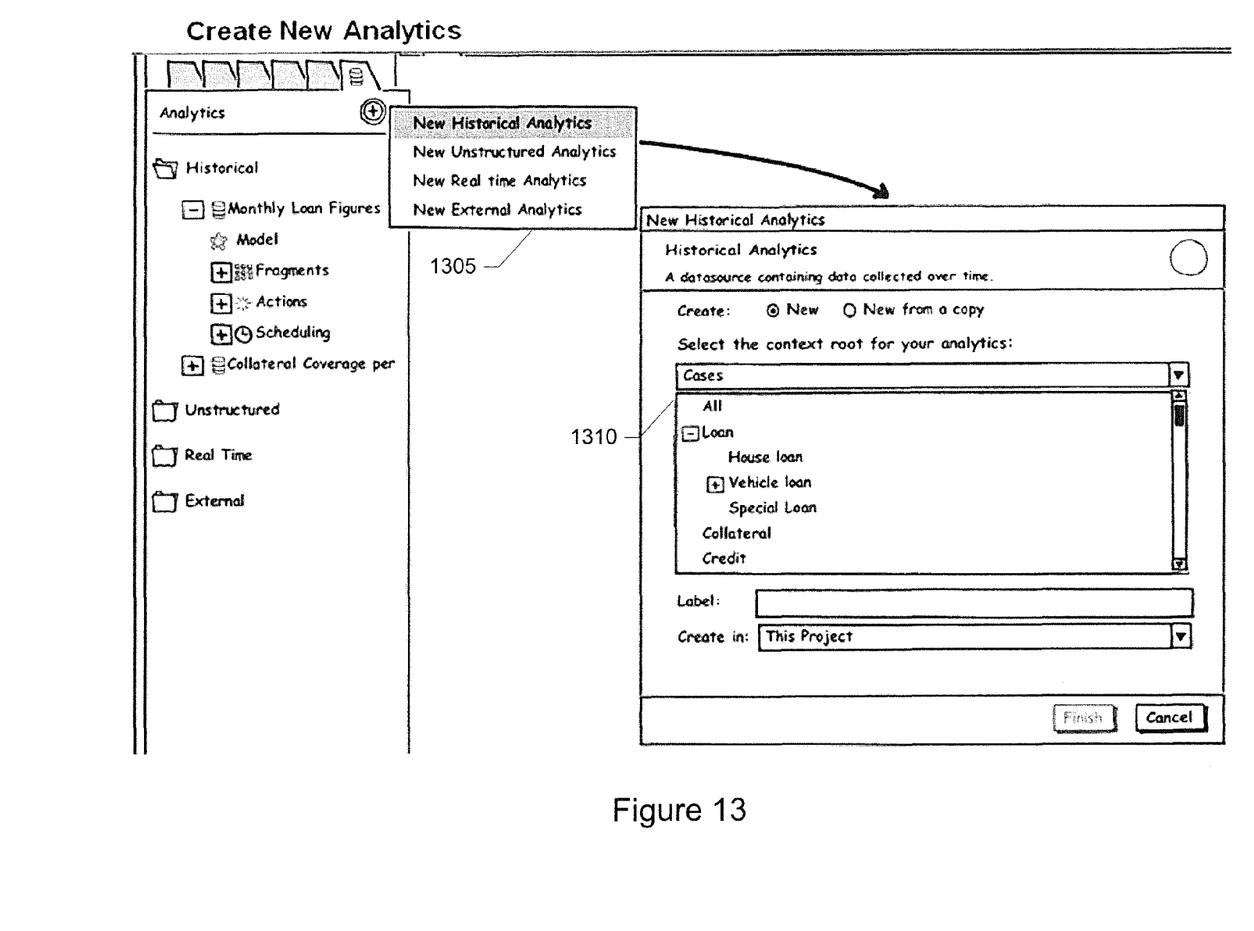
FIG. 13 shows a screen shot for a specific implementation for creating a report using report entities from a business domain.

FIG. 13 shows a screen shot of a specific implementation for creating a report. In this specific implementation, report entities from a business domain are used to construct a report. In a step 1305, the user (e.g., analyst) is directed to choose a new report based on a category (e.g., is it historical?, is it real-time?, and so forth). In a step 1310, the user is directed to choose from one of the business objects that were already created as part of the application. For example, "House Loan" may be a process, "Collateral" may be a business object, "Credit" may be an external credit report, and so forth.

In a specific implementation, a sequence flow of creation and usage of business-oriented entities includes the following steps:

1) User creates an application
1a) Creates a model for the business objects
1b) Defines roles, processes, and resources.
1c) Defines relationships between the objects.
2) System creates business-oriented report entities
2a) Entity is named and pre-filtered to report on the new object.
2b) Underlying query and filters are created based on the type.
2bi) Process report entities include start and completion times.
2bii) Report entities have links that mirror the relationships to other business objects.
3) User creates a report
3a) System displays the business-oriented report entities.
3b) System displays the links between the report entities.
3bi) Oft-traversed links (used by other reports) are displayed more prominently.
3bii) System allows navigation across the links to discover the meaning of the links by showing sample data that would be returned from this type of report.

Some specific examples of reports that may be created with the system include: 1) Simple Data Table (e.g., customer, product ordered, total cost, date ordered, performer name); 2) Process Instance Duration with SLA—dial gauge; 3) Average Process Duration with SLA—dial gauge; 4) Activity Instance Duration with SLA—Dial Gauge; 5) Count of Processes—Bar Chart by Day; 6) Count of Processes—Bar Chart by State; 7) Count of Processes—Pie Chart by Product Type (or Customer type); 8) Process Duration Trend—Average Daily;

9) Process Cost Trend—Total Daily; 10) Activity Drilldown Report—from Process Diagram, gives start time, duration, performer, and business data; 11) Role Chart—Bar Chart that gives the average time spent by each role; 12) Performer Chart—For a given role, gives the average time spent by each role; 13) Individual Performer Chart—Trend report that shows total time spent by an individual, e.g., "Patrick," each day; 14) Queue Management—for each queue, shows number of tasks per queue, queue threshold, and queue capacity; 15) Queue Management—for each queue, lists activities currently in the queue. Alerts may be based on process duration, activity duration, exceptional business data (e.g., customer buys a product for $1M), a queue nearing its threshold (e.g., 80 percent, 90 percent, or 100 percent), or on rejection (e.g., customer is turned down for a loan). In a specific implementation, instance and aggregation of fields is combined in the same report entity. For example, "count of ongoing instances" can be an aspect of "Process A" report entity. This can suggest aggregation and the system can then ask about the time period.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method for creating a report, the method comprising:
  receiving, by a server, a selection of a chart type for a report;
  determining, by the server, whether a data source is relevant to the selected chart type, wherein the data source is associated with a report entity;
  displaying, by the server, the report entity in response to a determination that the data source is relevant to the selected chart type;
  receiving, by the server, a selection of at least one report entity field associated with the report entity and based on the selected chart type;
  providing, by the server, a suggestion of at least one grouping category for the selected at least one report entity field;
  receiving, by the server, a selection of a first time period of the at least one grouping category;
  generating, by the server, a report containing information relating to the first time period of the at least one suggested grouping category;
  receiving, by the server, a selection of a second time period different from the first time period; and
  regenerating, by the server, the report containing information relating to the at least one suggested grouping category, wherein the information in the regenerated report is for the second time period.

2. The method of claim 1 further comprising:
  providing, by the server, suggestions of a plurality of grouping categories;
  receiving, by the server, a selection of one of the grouping categories; and
  generating, by the server, a report containing information relating to the selected grouping category.

3. The method of claim 1 wherein the suggestion of the at least one grouping category is based upon inclusion of the at least one grouping category in a previous report generated by the server.

4. The method of claim 1 further comprising:
  providing, by the server, suggestions of a plurality of grouping categories; and
  ranking, by the server, the suggestions based upon inclusion of the grouping categories in previous reports generated by the server.

5. The method of claim 1 wherein a duration of the first time period is different from a duration of the second time period.

6. The method of claim 1 wherein a duration of the first time period is the same as a duration of the second time period.

7. The method of claim 1 wherein the selected chart type comprises a pie chart.

8. The method of claim 1 wherein the selected chart type comprises a bar chart.

9. A method comprising:
  receiving, by a server, a selection of a chart type for a report;
  determining, by the server, whether a data source is relevant to the selected chart type, wherein the data source is associated with a report entity;
  displaying, by the server, the report entity in response to a determination that the data source is relevant to the selected chart type;
  receiving, by the server, a selection of a field, from the report entity, to be graphed to the selected chart type;
  providing, by the server, a suggestion of at least one grouping category for the selected field to be graphed;
  receiving, by the server, a selection of a first time period of the at least one grouping category;
  generating, by the server, a report containing information relating to the first time period of the at least one suggested grouping category;
  receiving, by the server, a selection of a second time period different from the first time period; and
  regenerating, by the server, the report containing information relating to the at least one suggested grouping category, wherein the information in the regenerated report is for the second time period.

10. The method of claim 9 further comprising:
  providing, by the server, suggestions of a plurality of grouping categories;
  receiving, by the server, a selection of one of the grouping categories; and
  generating, by the server, a report containing information relating to the selected grouping category.

11. The method of claim 9 wherein the suggestion is based upon inclusion of the at least one grouping category in a previous report generated by the server.

12. The method of claim 9 further comprising:
  providing, by the server, suggestions of a plurality of grouping categories; and
  ranking, by the server, the suggestions based upon inclusion of the grouping categories in previous reports generated by the server.

13. The method of claim 9 wherein a duration of the first time period is different from a duration of the second time period.

14. The method of claim 9 wherein a duration of the first time period is the same as a duration of the second time period.

15. The method of claim 9 wherein the information includes a chart graphing the selected field by the at least one suggested grouping category.

16. A computer program product, comprising a non-transitory computer-readable medium having a computer-readable program code embodied therein, the computer-readable program code adapted to be executed by one or more processors to implement a method for creating a report, the method comprising:
- receiving, by a server, a selection of a chart type for a report;
- determining, by the server, whether a data source is relevant to the selected chart type, wherein the data source is associated with a report entity;
- displaying, by the server, the report entity in response to a determination that the data source is relevant to the selected chart type;
- receiving, by the server, a selection of at least one report entity field associated with the selected report entity and based on the selection of the chart type;
- providing, by the server, a suggestion of at least one grouping category for the selected at least one report entity field;
- receiving, by the server, a selection of a first time period of the at least one grouping category;
- generating, by the server, a report containing information relating to the first time period of the at least one suggested grouping category;
- receiving, by the server, a selection of a second time period different from the first time period; and
- regenerating, by the server, the report containing information relating to the at least one suggested grouping category, wherein the information in the regenerated report is for the second time period.

17. The computer program product of claim 16 further comprising computer-readable program code for:
- providing, by the server, suggestions of a plurality of grouping categories;
- receiving, by the server, a selection of one of the grouping categories; and
- generating, by the server, a report containing information relating to the selected grouping category.

18. The method of claim 16 further comprising:
- providing, by the server, suggestions of a plurality of grouping categories; and
- ranking, by the server, the suggestions based upon inclusion of the grouping categories in previous reports generated by the server.

* * * * *